US012380071B2

(12) United States Patent
Asawa et al.

(10) Patent No.: US 12,380,071 B2
(45) Date of Patent: Aug. 5, 2025

(54) TRACKING DATA LINEAGE AND APPLYING DATA REMOVAL TO ENFORCE DATA REMOVAL POLICIES

(71) Applicant: Microsoft Technology Licensing, LLC, Redmond, WA (US)

(72) Inventors: Arpan Jugalkishor Asawa, San Francisco, CA (US); Brian Douglas Remick, Morgan Hill, CA (US); Marcus Vinicius Silva Gois, Bothell, WA (US); Ritesh Kumar Sinha, Fremont, CA (US); Sidi Lin, San Jose, CA (US); Sejal Kiran Shinde, Santa Clara, CA (US); Ryan Lee Jobse, Hillsboro, VA (US); Rong Guo, Sunnyvale, CA (US); Sharanya Chinnusamy, Fremont, CA (US); Marc Andrew Power, San Jose, CA (US); Marcus Jon Jager, Boulder Creek, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 17/355,873

(22) Filed: Jun. 23, 2021

(65) Prior Publication Data
US 2022/0414070 A1 Dec. 29, 2022

(51) Int. Cl.
*G06F 16/215* (2019.01)
*G06F 16/21* (2019.01)
*G06F 16/901* (2019.01)

(52) U.S. Cl.
CPC .......... *G06F 16/215* (2019.01); *G06F 16/219* (2019.01); *G06F 16/9024* (2019.01)

(58) Field of Classification Search
CPC ... G06F 16/215; G06F 16/219; G06F 16/9024
See application file for complete search history.

(56) References Cited

U.S. PATENT DOCUMENTS

| 9,659,042 | B2 | 5/2017 | Puri et al. |
| 10,637,669 | B2 | 4/2020 | Johnson et al. |
| 10,769,165 | B2 | 9/2020 | Simon et al. |
| 11,132,364 | B1 * | 9/2021 | Galati ............... G06F 16/24561 |

(Continued)

OTHER PUBLICATIONS

"Exploring Data Lineage", Retrieved from: https://web.archive.org/web/20200921201712/https:/cloud.google.com/data-fusion/docs/tutorials/lineage, Sep. 21, 2020, 5 Pages.

(Continued)

*Primary Examiner* — Amy Ng
*Assistant Examiner* — Antonio J Caiado
(74) *Attorney, Agent, or Firm* — Schwegman Lundberg & Woessner, P.A.

(57) ABSTRACT

A graph tracks the lineage of customer data, including when it was originally extracted from a customer computing system, and any transformation results indicating transformations that were performed on the customer data. The graph is traversed to identify nodes in the graph that have expired based upon data removal policies. The customer data represented by the expired nodes in the graph is deleted and the graph is modified to delete the expired nodes. The modified graph is then stored in persistent memory until data removal is next triggered.

20 Claims, 6 Drawing Sheets

(56) References Cited

U.S. PATENT DOCUMENTS

| | | | |
|---|---|---|---|
| 2015/0142750 A1 | 5/2015 | Mutalik et al. | |
| 2016/0006645 A1* | 1/2016 | Rave | H04L 67/5681 |
| | | | 709/203 |
| 2016/0330180 A1* | 11/2016 | Egorov | G09C 1/00 |
| 2017/0124464 A1 | 5/2017 | Crabtree et al. | |
| 2019/0147064 A1* | 5/2019 | Wee | G06F 16/162 |
| | | | 707/663 |
| 2019/0155926 A1* | 5/2019 | Scheideler | G06F 16/215 |
| 2020/0076712 A1* | 3/2020 | Hutchison | H04L 41/069 |
| 2020/0336509 A1* | 10/2020 | Wang | G06N 20/20 |
| 2021/0019126 A1* | 1/2021 | Rabinovitch | G06F 8/51 |
| 2021/0081550 A1 | 3/2021 | Raphael et al. | |
| 2021/0132855 A1* | 5/2021 | Huang | G06F 3/067 |
| 2022/0083604 A1* | 3/2022 | Ojha | G06F 16/90335 |
| 2022/0091940 A1* | 3/2022 | Kumar | G06F 11/1451 |
| 2022/0286409 A1* | 9/2022 | Sun | H04L 45/70 |
| 2022/0303295 A1* | 9/2022 | Erlingsson | H04L 63/1425 |
| 2022/0342932 A1* | 10/2022 | Monk | G06F 16/28 |
| 2024/0231964 A1 | 7/2024 | Liu | |

OTHER PUBLICATIONS

Das, Aveek, "Understanding Data Lineage in ETL", Retrieved from: https://www.sqlshack.com/understanding-dala-lineage-in-etl/, Sep. 3, 2020, 5 Pages.

Goyal et al., "Real-Time Data Lineage at UBS", Retrieved from: https://neo4j.com/blog/real-time-data-lineage-ubs/, Apr. 11, 2019, 18 Pages.

"International Search Report and Written Opinion Issued in PCT Application No. PCT/US22/029116", Mailed Date: Aug. 12, 2022, 10 Pages.

Clarke, et al., "Freenet: A Distributed Anonymous Information Storage and Retrieval System," Designing Privacy Enhancing Technologies, vol. 2009, Jan. 1, 2001, pp. 46-66.

International Search Report and Written Opinion received for PCT Application No. PCT/US23/080433, Mar. 1, 2024, 10 pages.

Invitation pursuant to Rule 137(4) EPC and Article 94(3) Received for European Application No. 22727680.5, mailed on Mar. 4, 2024, 03 pages.

* cited by examiner

TRACKING DATA LINEAGE AND APPLYING DATA REMOVAL TO ENFORCE DATA REMOVAL POLICIES

BACKGROUND

Computing systems are currently in wide use. Many computing systems host applications that are accessed by users or clients. Such applications often store user data and allow users to manipulate user data.

It is not uncommon for some organizations that host or run the applications or services to employ intelligence gathering systems to derive intelligence from the user data. Such intelligence gathering systems may read the customer data, aggregate it with other customer data, perform other types of transformations on the data, and store the results. The results may also be aggregated and transformed, and so on.

The discussion above is merely provided for general background information and is not intended to be used as an aid in determining the scope of the claimed subject matter.

SUMMARY

A graph generator generates a graph that tracks the lineage of user data, including when the user data was originally extracted from a user computing system, and any transformation results indicating transformations that were performed on the user data. The graph is traversed to identify nodes in the graph that have expired based upon data removal policies. The user data represented by the expired nodes in the graph is deleted and the graph is modified to delete the expired nodes. The modified graph is then stored in persistent memory until data removal is next triggered.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, user data can be extracted from user computing systems and used, often in artificial intelligence systems, in order to gain intelligence from the data. In processing the user data, the user data may be aggregated with other user data, it may be transformed using various types of transformation algorithms with the result being stored for even further processing. There are often regulations governing when user data must be deleted after it is extracted from the user computing system. For instance, some such regulations indicate that the user data must be deleted within 30 days after it is extracted. This may include transformed data that is data that was transformed based upon the original user data. Therefore, it can be difficult to determine which transformed data should be deleted when, because the underlying user data that was used in a transformation and that resulted in the transformed data may have been extracted from different user computing systems at different times.

The present discussion thus proceeds with respect to a system that generates a graph that tracks the lineage of user data, in a data intelligence computing system that may acquire intelligence from the user data. The graph includes the date on which the user data was originally extracted from the user computing system. Each node in the graph has a timestamp that indicates the date on which the earliest source data contributing to that node was extracted from a user computing system. Each node in the graph also has a path identifier identifying a location of the data corresponding to that node in the data operation computing system. Edges in the graph indicate source and destination nodes where data was taken from and where it was stored in the data intelligence computing system after transformation. The graph is intermittently traversed to identify nodes in the graph that have a timestamp that is expired based upon data removal policies. The path identified in the expired nodes is followed to delete data from the data intelligence computing system corresponding to the expired nodes. The expired nodes are also deleted from the graph, and the graph is stored in persistent memory. In one example, the source data in the data intelligence computing system is intermittently swept to update the graph. Data records in the data intelligence computing system are only processed to update the graph if the data records in the data intelligence computing system have been updated since the last time that the source data was swept. Thus, the sweep operation is efficient in that it is only looking for changes in the source data since the previous sweep operation was conducted.

Figure 1:
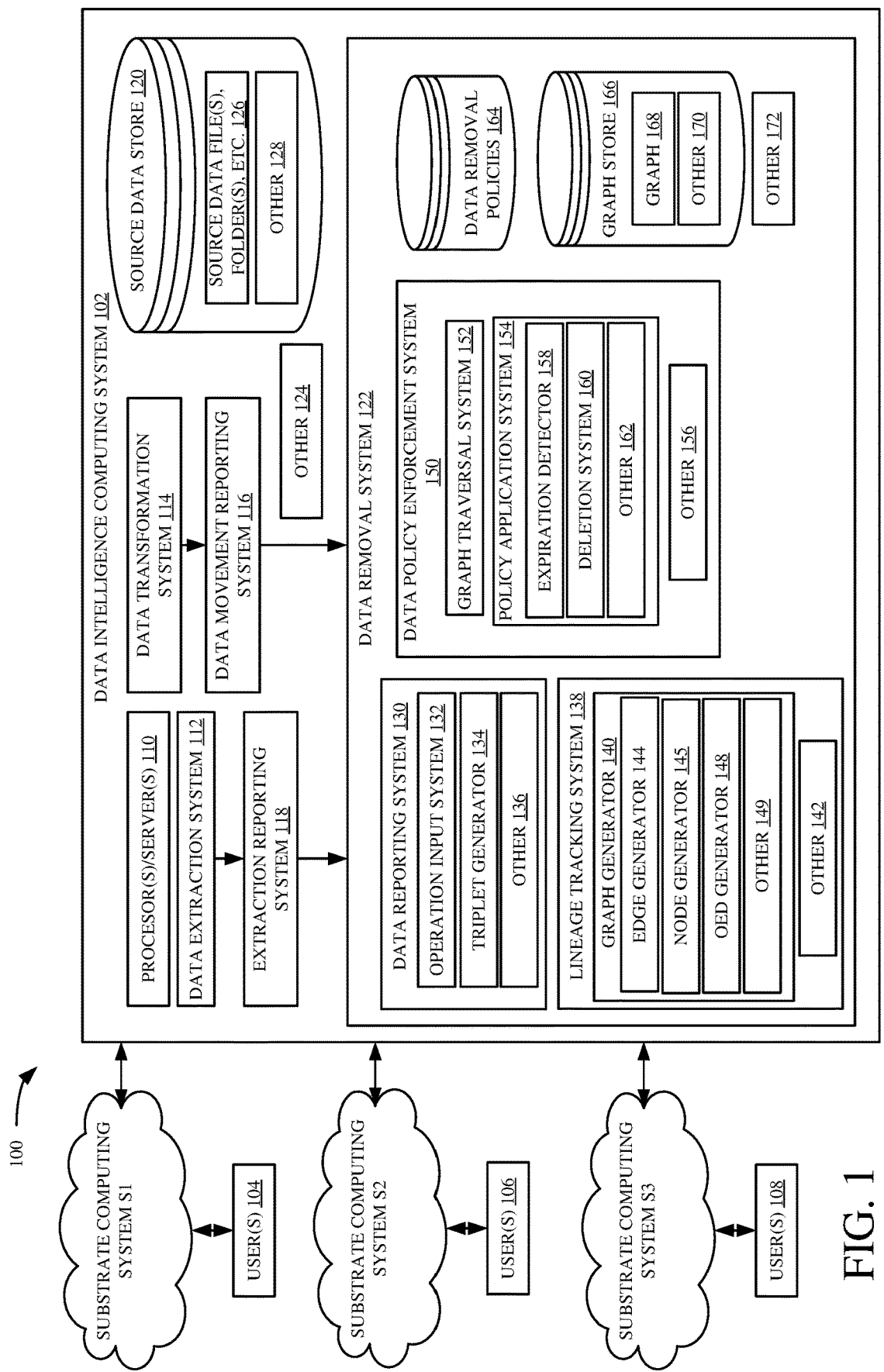
FIG. 1 is a block diagram of one example of a computing system architecture.

FIG. 1 is a block diagram of one example of a computing system architecture 100 that includes data intelligence computing system 102 that can access user data in substrate computing systems labeled S1, S2, and S3. FIG. 1 also shows that substrate S1 computing system may be accessed by one or more users 104. Substrate computing system S2 may be accessed by users 106 and substrate computing system S3 may be accessed by one or more users 108.

Data intelligence computing system 102 can access user data from substrates S1, S2, and S3 and perform transformations on that data to obtain intelligence and other knowledge from the customer data. In the example shown in FIG. 1, data intelligence computing system 102 can include one or more processors or servers 110, data extraction system 112, data transformation system 114, data movement reporting system 116, extraction reporting system 118, data store 120, data removal system 122, and other items 124. Data store 120 can include source data files, folders, etc. indicated by number 126. Data store 120 can include other items 128 as well.

Data removal system 122, in the example shown in FIG. 1, includes data reporting system 130 which, itself, can include operation input system 132, triplet generator 134 and other items 136. Data removal system 122 can also include lineage tracking system 138 which, itself, can include graph generator 140 and other items 142. Graph generator 140 can include edge generator 144, node generator 145, OED generator 148, and other items 149.

Data removal system 122 can include data policy enforcement system 150 which, itself, can include graph traversal system 152, policy application system 154, and other items 156. Policy application system 154 can include expiration detector 158, deletion system 160, and other items 162.

Data removal system 122 can also include data removal policies 164, graph store 166 (which, itself, can include graph 168 and other items 170), and other items 172. Before describing the overall operation of architecture 100 in more detail, a brief description of some of the items in architecture 100, and their operation, will first be provided. It will be appreciated that substrate computing systems S1, S2, and S3 can be any of a wide variety of different types of computing systems. For instance, substrate computing systems S1, S2, and S3 may host services that are accessed by various users so the users can access and manipulate user data. The users may be clients, enterprise users, individual users, or any of a wide variety of other types of users.

Data extraction system 112 may intermittently extract user data from substrates S1, S2, and S3. When data is extracted, it is stored in a source data file, folder, etc. 126 in data store 120. Extraction of customer data from any of the substrates S1-S3 is reported by extraction reporting system 118 to data removal system 122. The extraction can be reported as soon as the extraction occurs, or the extractions can be intermittently reported.

Data transformation system 114 accesses source data from source data files, folders, etc. 126 in data store 120 and performs transformations on that data in order to obtain intelligence or other information. The transformations can include aggregations, algorithms that are run on the data, and a wide variety of other transformations. The results of the transformations are also stored by data transformation system 114 in the source data files, folders, etc. 126 in data store 120. Data movement reporting system 116 reports data movement (e.g., the extraction of data from data store 120, the transformation of that data, and the storing of the result of that transformation) to data removal system 122.

Data reporting system 130 detects the data extractions and data movement through operation input system 132. Operation input system 132 may expose an interface that can be accessed by extraction reporting system 118 and data movement reporting system 116, or operation input system 132 can detect the extractions in data movements by conducting a sweep of source data files, folders, etc. 126 to identify changes in the source data files, folders, etc. 126. For instance, data reporting system 130 can sweep data store 120 intermittently to look for any source data files, folders, etc. 126 that have been created or modified since the last time data store 120 was swept. Triplet generator 134 generates an indicator indicative of those source data files, folders, etc. 126 and provides the indicators to lineage tracking system 138. In this way, the data store 120 can be swept intermittently, and only recent changes to the data store 120 will be identified and have corresponding nodes added to graph 168 by lineage tracking system 138.

Triplet generator 134 generates an indication corresponding to each extraction and data movement. In one example, the indications are data triplets that are comprised of a timestamp value showing the time when the data extraction or transformation occurred, the path to the source data (the location from which data was extracted) in data store 120 and the path to the destination data (the location in data store 120 that stores the result of a transformation).

Lineage tracking system 138 tracks the lineage of customer data from the substrate that it was extracted from to any destination locations in data store 120. Graph generator 140 generates a graph with nodes and edges to track the movement of user data. Node generator 145 generates nodes in the graph that show a path to data in data store 120 represented by the node. Edge generator 144 generates edges in the graph that connected the nodes. The edges include an indicator of the data movement from one source location in data store 120 to another location in data store 120. OED generator 148 identifies an original extraction data which is the earliest date that any customer data that was used to derive the node was extracted from its corresponding substrate S1-S3. Graph generator 140 then stores the nodes and edges as graph 168 in graph store 166.

Data policy enforcement system 150 uses graph traversal system 152 to traverse the graph 168. Expiration detector 158 identifies any expired nodes in the graph 168 by comparing the OED corresponding to each node to an expiration date. Deletion system 160 marks any expired nodes for deletion. Deletion system 160 also interacts with data store 120 to follow the path corresponding the expired nodes to delete the source data files, folders, etc. 126 corresponding to the expired nodes. Deletion system 160 then deletes the expired nodes from graph 168, itself.

Figure 2:
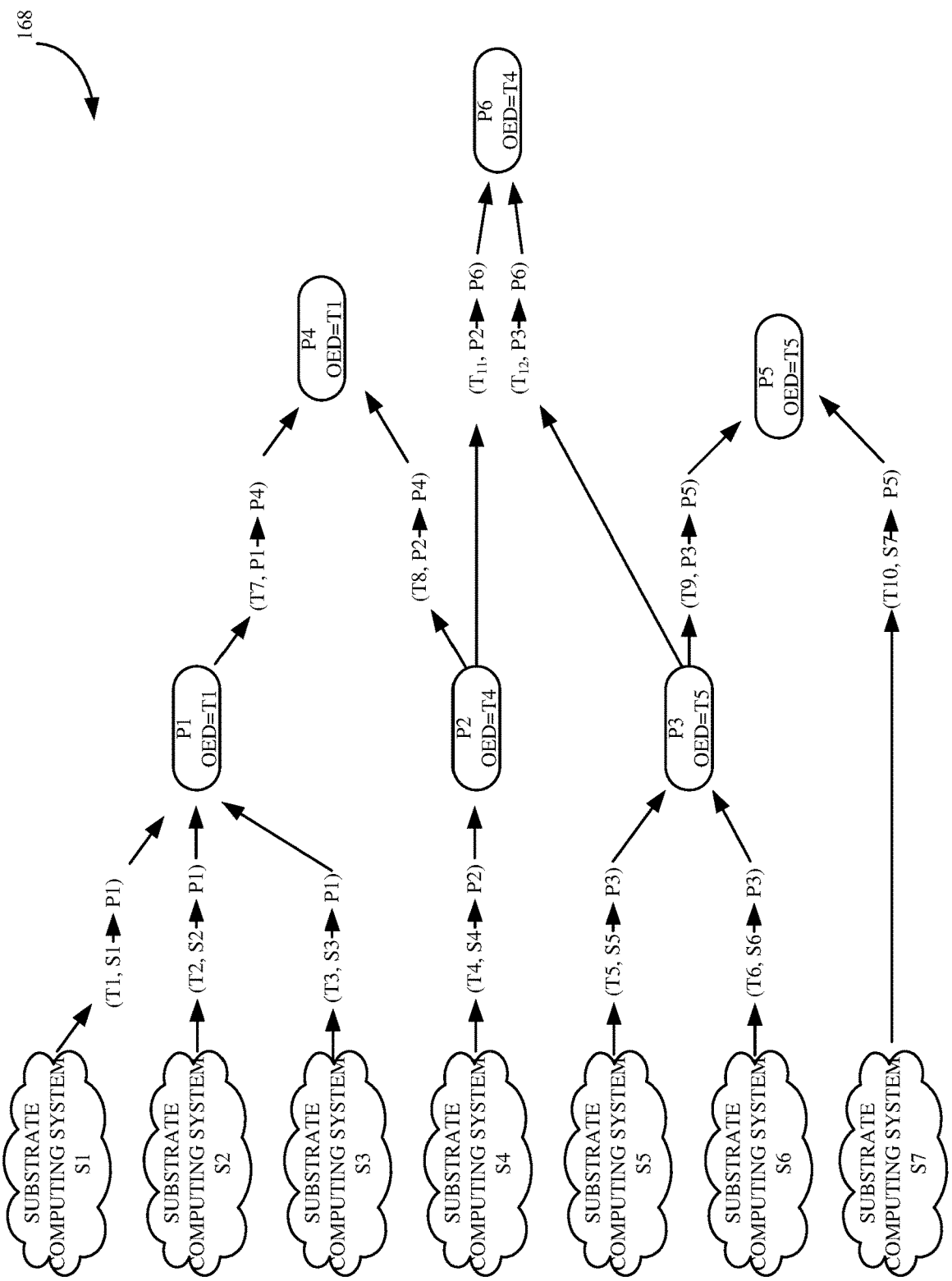
FIG. 2 is a diagram of one example of a customer data transformation graph.

FIG. 2 shows one example of a customer data transformation graph 166. Graph 166 shows substrates S1, S2, S3, S4, S5, S6, and S7. Each of the substrates may illustratively be a computing system environment, such as a cloud service or other computing system that is exposed to user interactions and stores user data. The user data may be individual user data, organization data, enterprise data, or a combination of different types of data. The data may include electronic mail data, productivity data, or any of a wide variety of other types of data. In one example, data extraction system 112 can extract data from substrates S1-S7 and store that data in source data files, folders, etc. 126 in data store 120. When data is extracted by data extraction system 112, extraction reporting system 118 reports that data extraction to data removal system 122. Triplet generator 134 then generates a triplet of data that reflects the extraction of the data from the various substrates and places the data into data store 120. The triplet includes a timestamp indicative of a time when the data was extracted from the corresponding substrate, and then a set of path names, the first being a source path that identifies a path to the source from which the data was extracted and the second being a destination path that identifies a path to the destination where the data is stored in data store 120. For instance, triplet generator 134 generates the triplet (T1, S1→P1) that represents extraction of data from substrate S1 and placing it at a location in data store 120 that can be accessed by following a path P1. For the data extracted from substrate S2, triplet generator 134 generates the triplet (T2, S2, →P1) and for the data extracted from substrate S3, triplet generator 134 generates the triplet (T3, S3, →P1).

Data extraction system 112 extracts data from substrate S4 and places it at a location in data store 120 identified by path P2. Therefore, triplet generator 134 generates the triplet (T4, S4→P2) to represent that data extraction. Data extraction system 112 extracts data from substrate S5 and places it in data store 120 at a location that can be identified by path P3. Data extraction system 112 extracts data at time T6 from substrate S6 and places it at the same location that can be identified by path P3. Therefore, triplet generator 134 generates the triplet (T5, S5→P3) to indicate the extraction from substrate S5, and the triplet (T6, S6→P3) to represent the extraction from substrate S6.

The triplets are provided for triplet generator 124 to lineage tracking system 138. Edge generator 144 generates edges in the graph representing the movement identified in the triplets, and node generator 145 generates nodes P1, P2 and P3 in graph 168 representing the destination of the data extracted from the substrates. OED generator 148 generates an OED corresponding to each of the nodes P1, P2 and P3. The OED represents the earliest (or oldest) of the timestamps on the source data corresponding to that node. For instance, the OED for node P1 is T1 because T1 is older than both T2 and T3. The OED for node P2 is T4, and the OED for node P3 is T5 because T5 is older than T6.

At time T7, data transformation system 114 extracts the data located in data store 120 at path location P1. At time T8, data transformation system 114 extracts the data from data store 120 located at the location identified by path P2. Data transformation system 114 performs a transformation by aggregating the data from location P1 with the data from location P2 and stores the result of that transformation in data store 120 at a location identified by path P4. The data transformation is reported to data reporting system 130 by data movement reporting system 116. Triplet generator 134 generates the triplets (T7, P1→P4) and (T8, P2→P4) to represent the movement of data (or the transformation results) from nodes P1 and P2 to node P4. Those triplets are provided to graph generator 140 where node generator 145 generates a node P4 in graph 168 and edge generator 144 generates the edges in the graph from nodes P1 and P2 to node P4 represented by the triplets (T7, P1→P4) and (T8, P2→P4). OED generator 148 generates the OED for node P4 as the earliest of the times when data that gives rise to the data stored in path P4 was extracted from its corresponding substrate. OED generator 148 does this by transitively tracking backward along the paths leading to node P4 to identify the earliest timestamp on any node in that path. Therefore, OED generator 148 transitively traverses backward along the path from node P4 to node P1 to identify that the OED for node P1 is T1. OED generator 148 then traverses backwardly along the path from node P4 to P2 to identify that the OED of node P2 is T4. Because T1 occurred before T4, then OED generator 148 assigns an OED of time T1 to node P4 in graph 168.

At time T9, data transformation system 114 extracts data from data store 120 at the location identified by path P3 and at time T10 data extraction system 112 extracts data from substrate S7. Data transformation system 114 combines the data extracted from path location P3 with the data extracted from substrate S7 and performs a transformation on that data and stores the result of the transformation in data store 120 at a location identified by path P5. This data movement is reported by data movement reporting system 116 to data reporting system 130. The data extraction from substrate S7 is reported by extraction reporting system 118 to data reporting system 130. In response, triplet generator 134 generates the triplet (T9, P3→P5) and the triplet (T10, S7→P5) to represent the movement of data from path location P3 and the extraction of data from substrate S7. Node generator 145 then generates node P5 in graph 168 and edge generator 144 generates the edges from node P3 and substrate S7 to node P5. OED generator 148 transitively traverses graph 168 backward from node P5 to node P3 and identifies an OED at node P3 of T5. OED generator 148 then compares timestamp T5 to timestamp T10 and determines that timestamp T5 is oldest. Thus, OED generator 148 assigns an OED to node P5 of time T5.

At time T11, data transformation system 114 extracts data from data store 120 at the path location P2 and also extracts data from data store 120 at the path location P3 and combines that data or transforms it and stores the result in the data store 120 at the path location P6. This data movement is reported by data movement reporting system 116 to data reporting system 130 through operation input system 132. Triplet generator 134 then generates a triplet (T11, P2→P6) to represent the extraction of data from path location P2 and (T12, P3→P6) to represent the extraction of data from the path location P3. Those triplets are provided to graph generator 148. Node generator 145 generates node P6 in graph 168 and edge generator 144 generates the edges in graph 168 leading from node P2 to node P6 and leading from node P3 to node P6. OED generator 148 transitively traverses the graph 168 backward from node P6 to node P2 to identify the OED of node P2 as T4. OED generator 148 also traverses backwardly from node P6 to node P3 and determines that the OED assigned to node P3 is T5. OED generator 148 compares timestamp T4 to timestamp T5 to identify that timestamp T4 is older than timestamp T5. Therefore, OED generator 148 assigns an OED to node P6 of T4.

Of course, it will be appreciated that the graph structure illustrated in FIG. 2 is only one example of a structure that can be used to represent graph 168. Other structures can be used as well.

Figure 3A:
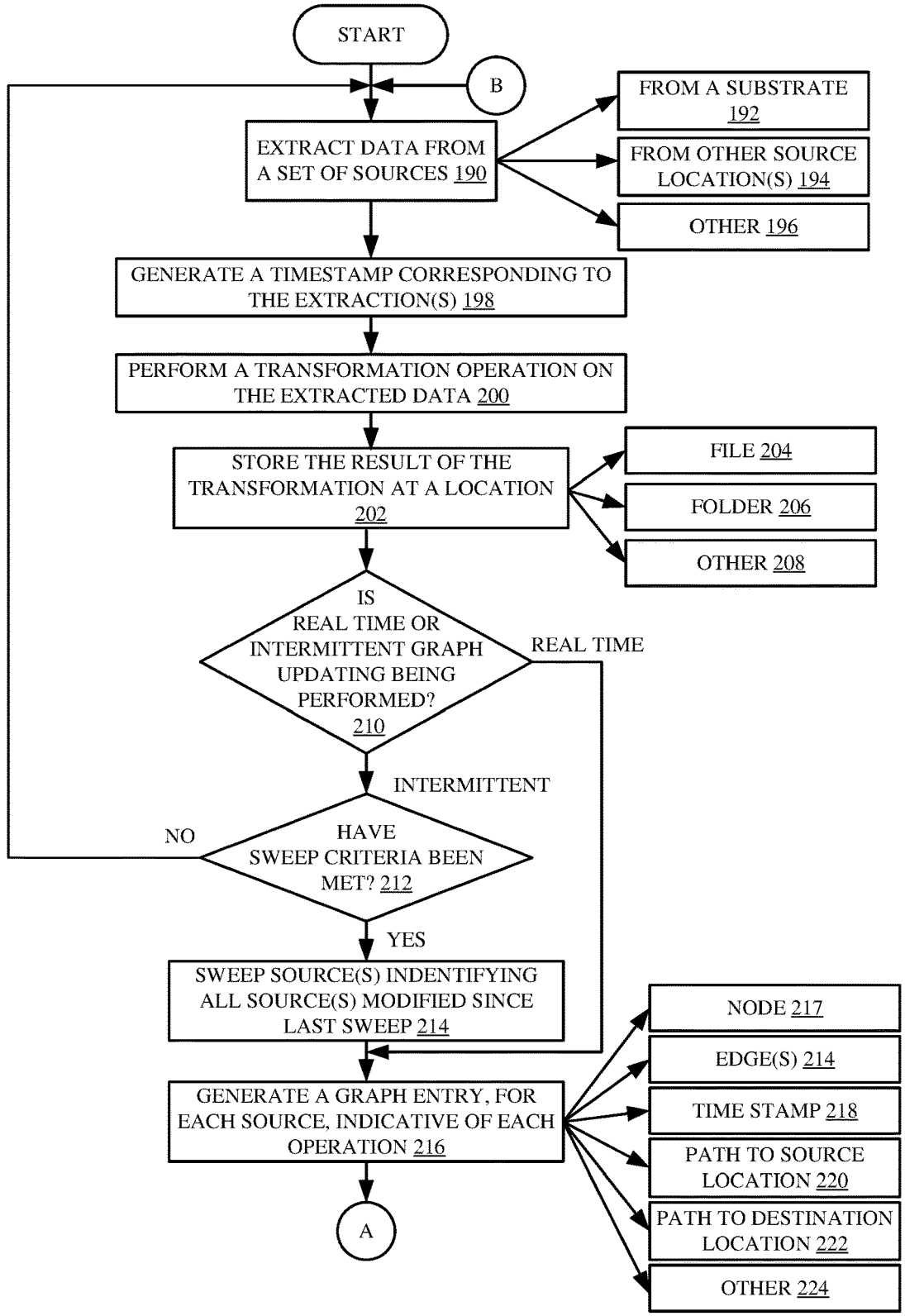
FIGS. 3A and 3B (collectively referred to herein as FIG. 3) show a flow diagram illustrating one example of the operation of a computing system architecture in generating a graph, traversing the graph to identify expired nodes, and deleting user data corresponding to the expired nodes.
Figure 3B:
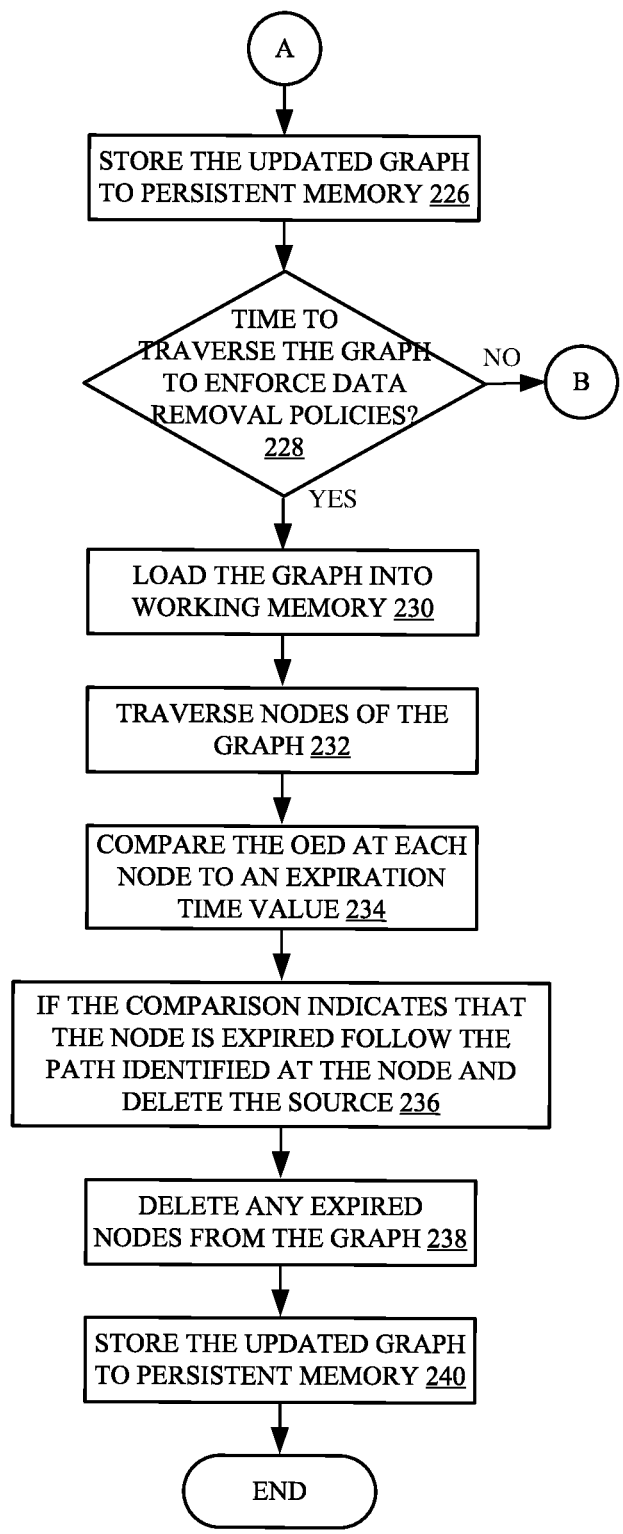

FIGS. 3A and 3B (collectively referred to herein as FIG. 3) show a flow diagram illustrating one example of the operation of data intelligence computing system 102 and data removal system 122 in detecting movement of data in data store 120 based on transformations performed by data transformation system 114 and generating graph 168 representing those movements. FIG. 3 also illustrates the operation of data policy enforcement system 150 in traversing graph 168 to identify data in data store 120 that needs to be deleted to enforce data removal policies 164.

Data transformation system 114 extracts data from a set of sources (such as source data files, folders, etc.) 126 in data store 120. Extracting data from a set of sources is indicated by block 190 in the flow diagram of FIG. 3. The source can be from a substrate as indicated by block 192, or from other source locations in data store 120, as indicated by block 194. Extracting data from a set of sources can be performed by data extraction system 112 or data transformation system 114 or in other ways 196. The component that extracts the data (either data extraction system 112 or data transformation system 114) generates a timestamp corresponding to when the data was extracted from its source location. Generating a timestamp is indicated by block 198 in the flow diagram of FIG. 3.

Data transformation system 114 then performs a transformation operation on the extracted data, as indicated by block 200. The transformation may be to aggregate data, or process data in other ways.

Data transformation system 114 then stores the result of the transformation at a location in data store 120. Storing the result of the transformation is indicated by block 202. The result of the transformation can be stored in a file 204, in a folder 206, or in another location 208 that can be identified by a path name.

It should be noted that, in one example, graph generator 140 can generate graph 168 in real time, as soon as data movements and extractions are reported by data movement reporting system 116 and extraction reporting system 118. In another example, operation input system 132 can sweep data store 120 intermittently, identifying files, folders, etc. to determine when data has moved. Determining whether the graph is generated or updated in real time or intermittently is indicated by block 210 in the flow diagram of FIG. 3.

If the graph 168 is updated intermittently, then operation input system 132 determines whether it is time to sweep data store 120 to look for updates to the source data files, folders, etc. 126. The determination as to whether to sweep the data store 120 may be based on a wide variety different types of criteria, such as time-based criteria, change-based criteria, or other criteria. Determining whether the sweep criteria have been met is indicated by block 212 in the flow diagram of FIG. 3. If the sweep criteria have not yet been met, processing reverts to block 190 where data transformation system 114 continues to transform data and data extraction system 112 continues to extract data. Once the sweep criteria have been met, as determined at block 212, then operation input system 132 sweeps the sources in data store 120, identifying all sources that have been modified since a last time that data store 120 was swept. Sweeping data store 120 is indicated by block 214 in the flow diagram of FIG. 3.

For each change in data store 120 that is identified during a data store sweep operation (if the graph is being updated intermittently) or for the data movement or extraction reported by data movement reporting system 116 or extraction reporting system 118 (if the graph 168 is being updated as data in data store 120 changes), a graph entry is generated in graph 168 that is indicative of the operation (extraction or data movement and transformation). Generating a graph entry is indicated by block 216 in the flow diagram of FIG. 3. The graph entry illustratively includes a time stamp 218, a path to the source location 220, and a path to the destination location 222. The graph entry can include other items 224 as well. The graph entry illustratively includes a node 217 and one or more edges 219 from prior nodes in the graph to a current node in the graph. The graph entry can include a time stamp indicating when data was extracted from its source, a path 220 to the source location from which the data was extracted and a path to the destination location 222 where the result of the transformation is stored. The graph entry can include other items 224 as well. The graph generator 140 then stores the updated graph 168, including the most recently generated graph entries, to data store 166. Storing the updated graph to persistent memory 166 is indicated by block 226 in the flow diagram of FIG. 3.

At some point, data policy enforcement system 150 determines that it is time to traverse graph 168 to enforce the data removal policies 164. This determination may be based upon the data removal policies themselves. For instance, it may be that data removal policies 164 indicate that user data must be removed from data store 120 within thirty days of when it is extracted from its corresponding substrate. In that case, data policy enforcement system 150 may enforce the data removal policies daily. Until it is time to traverse the graph 168 to enforce the data removal policies 164, as determined at block 228 in FIG. 3, processing reverts to block 190 where data extraction system 112 can continue to extract user data from the substrates and data transformation system 114 can continue to transform that data.

However, if, at block 228, it is determined that it is time to traverse graph 168 to enforce the data removal policies 164, then graph traversal system 152 loads graph 168 into working memory, such as RAM, as indicated by block 230. Graph traversal system 152 then begins traversing the nodes of the graph (in either direction), as indicated by block 232. Policy application system 154 applies the data removal policies 164, as graph traversal system 152 traverses the graph. Expiration detector 158 compares the OED at each node in graph 168 to an expiration time value, as indicated at block 234. For instance, if the expiration time value is 30 days (meaning that the user data is to be deleted within 30 days of being extracted from the corresponding substrate), then expiration detector 158 compares the OED at each node in graph 168 to determine whether it is older than 30 days. If so, then the node is identified as being an expired node.

If the comparison indicates that the node under analysis is expired, then deletion system 160 follows the path corresponding to the expired node which leads deletion system 160 to the location of the data represented by that node in data store 120. Deletion system 160 then deletes the information at that path location from data store 120 (or interacts with data store 120 or another item to delete it). Following the path of an expired node to the data store location in data store 120 and deleting the information at that path location is indicated at block 236 of the flow diagram of FIG. 3. Deletion system 160 then deletes the expired node from the graph 168, as indicated by block 238. Therefore, after graph traversal system 152 has traversed the entire graph 168, and expiration detector 158 has identified expired nodes and deletion system 160 has deleted the data from data store 120 corresponding to the expired nodes and has also deleted the expired nodes themselves from graph 168, this means that graph 168 has now been updated so that all expired nodes are deleted from it. Similarly, data store 120 has been updated so that any user data that was extracted at least 30 days ago is deleted from data store 120. The updated graph 168 is then stored in graph store 166. Storing the updated graph in persistent memory 166 is indicated by block 240 in the flow diagram of FIG. 3.

It can thus be seen that the present system generates a graph representing user data extracted from substrates and operated on by data intelligence computing system 102. The user data is tracked in a graph 168 so that it can be deleted from data store 120 based upon the data removal policies 164. Expired nodes are also deleted from graph 168 so that graph 168 does not grow to an unwieldly size. Similarly, because graph 168 is stored in a persistent data store 166, the size of graph 168 is scalable by simply adding additional persistent storage. Also, when source data store 120 is swept intermittently, the sweep may be configured to only look for data sources that have been modified since the last data sweep operation, which makes sweeping data store 120 much more efficient than having to sweep the entire data store 120.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the actuators can be actuated using touch gestures. Also, where the device that displays them has speech recognition components, the actuators can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
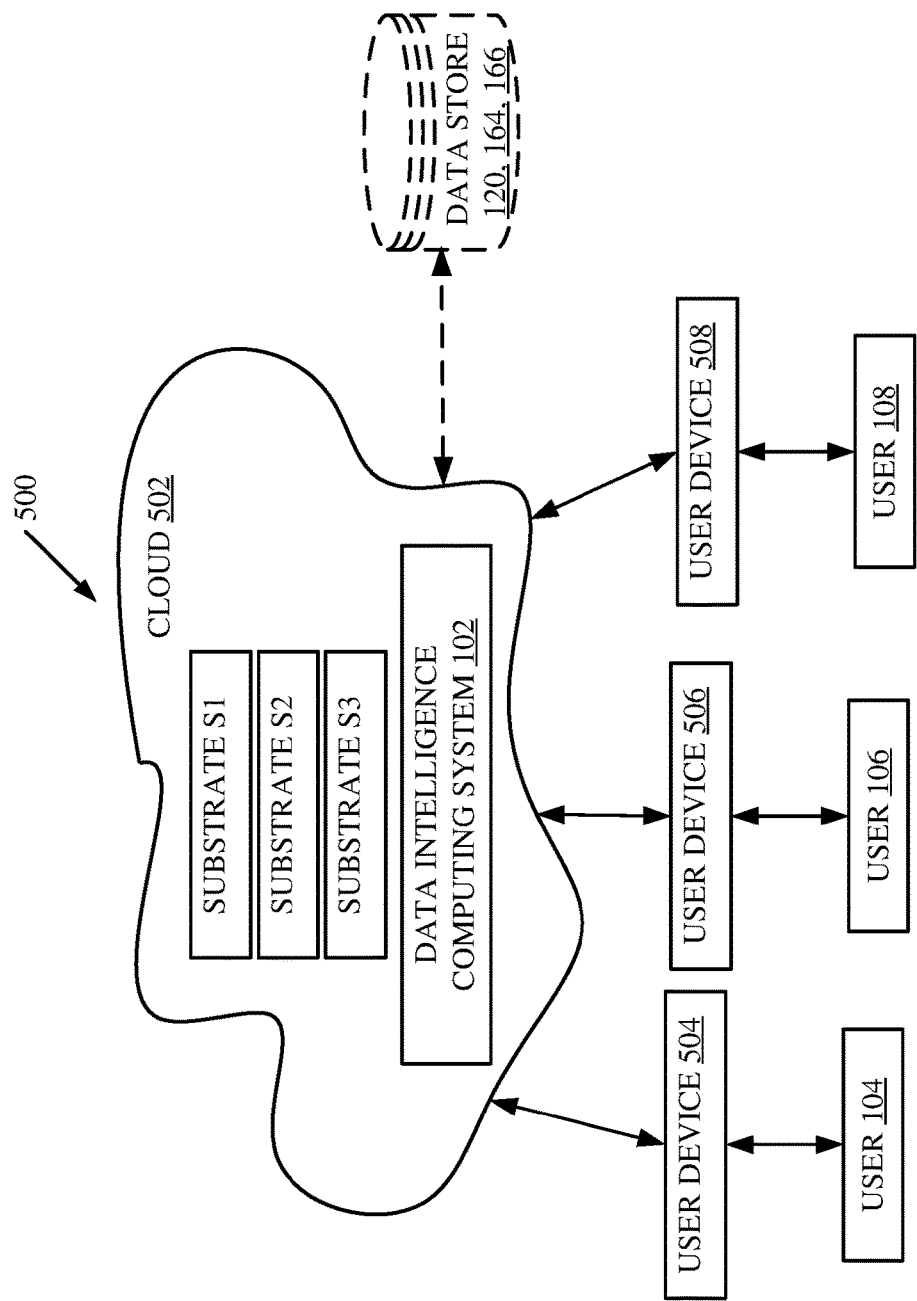
FIG. 4 is a block diagram showing one example of a remote server architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or the resources can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that the substrates S1-S3 and data intelligence computing system 102 can be located in cloud 502 (which can be public, private, or a combination where portions are public while others are private). Therefore, users 104, 106, and 108 use a user devices 504, 506, and 508 to access those systems through cloud 502.

FIG. 4 also depicts another example of a cloud architecture. FIG. 4 shows that it is also contemplated that some elements of computing system 102 can be disposed in cloud 502 while others are not. By way of example, data stores 120, 164, and 166 can be disposed outside of cloud 502, and accessed through cloud 502. Regardless of where they are located, the data stores can be accessed directly, by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
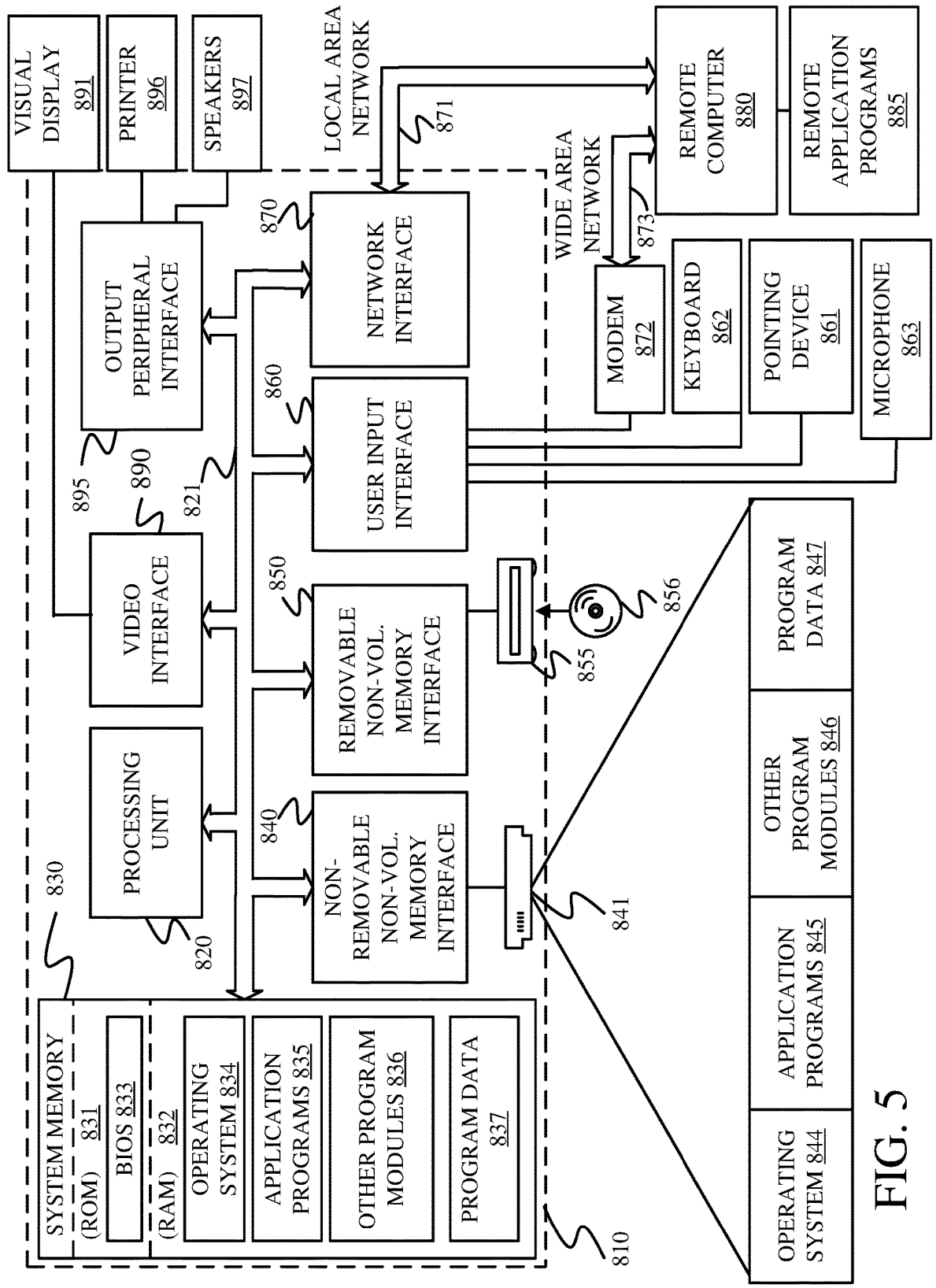
FIG. 5 is a block diagram showing one example of a computing environment that can be used in the architecture shown in the previous FIGS.

FIG. 5 is one example of a computing environment in which architecture 100, or parts of it, (for example) can be deployed. With reference to FIG. 5, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850. Persistent memory, in one example, can be memory that stores data structures so that they can continue to be accessed even after the end of the process that created or last modified them. So for instance, graph 168 can be stored in persistent memory 166 so it can be accessed during subsequent graph traversal operations and need not be rebuilt each time a graph traversal operation is to be performed.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 4, provide storage of computer readable instructions, data structures, program modules and other data for the computer 810. In FIG. 4, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 4 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 4 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a data removal computer system, comprising:
  a graph generator generating a first node in a graph, the first node identifying a first path to a first storage location in a source data store where a first portion of user data, that is extracted from a first computing system at a first time, is stored and the first node having an original extraction date (OED) value identifying the first time,
  a graph traversal system that intermittently traverses the graph;

an expiration detector that identifies a set of expired nodes as nodes in the graph that have an OED that is older than an expiration time; and a deletion system that, for each expired node in the set of expired nodes, deletes information at a location in the source data store identified by a path identified by the expired node in the set of expired nodes and, for each expired node in the set of expired nodes, deletes the expired node from the graph to obtain a modified graph and stores the modified graph in persistent memory.

Example 2 is the data removal computing system of any or all previous examples wherein the graph generator is configured to generate a second node in the graph, the second node identifying a second path to a second storage location in the source data store where a second portion of user data, that is extracted from the first computing system at a second time, is stored and the second node having an OED value identifying the second time, and the graph generator being configured to generate a third node in the graph, the third node identifying a third path to a third storage location in the source data store where a result of a transformation performed on the first portion of user data and the second portion of user data is stored and the third node having an OED value identifying an older of the first time and second time.

Example 3 is the data removal computing system of any or all previous examples and further comprising:

a data reporting system configured to identify changes in the source data store, the graph generator being configured to modify the graph based on the changes to the source data store.

Example 4 is the data removal computing system of any or all previous examples wherein the data reporting system is configured to identify the first time when the first portion of user data is extracted from a first computing system and identify the first storage location where the first portion of user data is stored in the source data store, to identify the second time when the second portion of user data is extracted from the first computing system and identify the second storage location where the second portion of user data is stored, and to identify the third time when the first portion of user data is extracted from the first storage location and when the second portion of user data is extracted from the second storage location and identify the third storage location where the result of the transformation performed on the first portion of user data and the second portion of user data is stored.

Example 5 is the data removal computing system of any or all previous examples wherein the data reporting system is configured to identify the changes in the source data store by intermittently sweeping the source data store to identify the changes to the source data store.

Example 6 is the data removal computing system of any or all previous examples wherein the data reporting system is configured to intermittently sweep the source data store by identifying a portion of the source data store that has been modified since a last time the source data store was swept and intermittently sweeping only the identified portion of the source data store.

Example 7 is the data removal computing system of any or all previous examples wherein the data reporting system is configured to:

expose an interface and receive a change indicator through the exposed interface, the change indicator being indicative of a change to the source data store.

Example 8 is the data removal computing system of any or all previous examples wherein the graph generator comprises:

an edge generator configured to generate an edge between the first node in the graph and the third node in the graph, the edge including a time stamp indicating when data was extracted from the first storage location, a source path indicator comprising the first path, and a destination path indicator comprising the third path.

Example 9 is the data removal computing system of any or all previous examples wherein the edge generator is configured to generate an edge between the second node in the graph and the third node in the graph, the edge including a time stamp indicating when data was extracted from the second storage location, a source path indicator comprising the second path, and a destination path indicator comprising the third path.

Example 10 is a computer implemented method, comprising:

generating a first node in a graph, the first node identifying a first path to a first storage location in a source data store where a first portion of user data, that is extracted from a first computing system at a first time, is stored and the first node having an original extraction date (OED) value identifying the first time;

generating a second node in the graph, the second node identifying a second path to a second storage location in the source data store where a second portion of user data, that is extracted from the first computing system at a second time, is stored and the second node having an OED value identifying the second time;

generating a third node in the graph, the third node identifying a third path to a third storage location in the source data store where a result of a transformation performed on the first portion of user data and the second portion of user data is stored and the third node having an OED value identifying an older of the first time and second time;

intermittently traversing the graph to identify a set of expired nodes as nodes in the graph that have an OED that is older than an expiration time;

for each expired node in the set of expired nodes, deleting information at a location in the source data store identified by a path identified by the expired node in the set of expired nodes;

for each expired node in the set of expired nodes, deleting the expired node from the graph to obtain a modified graph; and storing the modified graph in persistent memory.

Example 11 is the computer implemented method of any or all previous examples and further comprising identifying changes in the source data store wherein identifying changes comprises:

identifying the first time when the first portion of user data is extracted from a first computing system and identifying the first storage location where the first portion of user data is stored in the source data store;

identifying the second time when the second portion of user data is extracted from the first computing system and identifying the second storage location where the second portion of user data is stored; and identifying the third time when the first portion of user data is extracted from the first storage location and when the second portion of user data is extracted from the second storage location and identifying the third storage location where a result of a transformation performed on the first portion of user data and the second portion of user data is stored.

Example 12 is the computer implemented method of any or all previous examples wherein identifying changes in the source data store comprises:
  intermittently sweeping the source data store to identify the changes to the source data store.

Example 13 is the computer implemented method of any or all previous examples wherein intermittently sweeping the source data store comprises:
  identifying a portion of the source data store that has been modified since a last time the source data store was swept; and
  intermittently sweeping only the identified portion of the source data store.

Example 14 is the computer implemented method of any or all previous examples wherein identifying changes comprises:
  exposing an interface; and
  receiving a change indicator through the exposed interface, the change indicator being indicative of a change to the source data store.

Example 15 is the computer implemented method of any or all previous examples and further comprising:
  generating an edge between the first node in the graph and the third node in the graph, the edge including a time stamp indicating when data was extracted from the first storage location, a source path indicator comprising the first path, and a destination path indicator comprising the third path.

Example 16 is the computer implemented method of any or all previous examples and further comprising:
  generating an edge between the second node in the graph and the third node in the graph, the edge including a time stamp indicating when data was extracted from the second storage location, a source path indicator comprising the second path, and a destination path indicator comprising the third path.

Example 17 is a data removal computing system, comprising:
  one or more processors;
  a data store storing computer executable instructions which, when executed by the one or more processors, causes the one or more processors to implement:
  a graph generator generating a first node in a graph, the first node identifying a first path to a first storage location in a source data store where a first portion of user data, that is extracted from a first computing system at a first time, is stored and the first node having an original extraction date (OED) value identifying the first time;
  a graph traversal system that intermittently traverses the graph;
  an expiration detector that identifies a set of expired nodes as nodes in the graph that have an OED that is older than an expiration time; and
  a deletion system that, for each expired node in the set of expired nodes, deletes information at a location in the source data store identified by a path identified by the expired node in the set of expired nodes and, for each expired node in the set of expired nodes, deletes the expired node from the graph to obtain a modified graph and stores the modified graph in persistent memory.

Example 18 is the data removal computing system of any or all previous examples wherein the graph generator is configured to generate a second node in the graph, the second node identifying a second path to a second storage location in the source data store where a second portion of user data, that is extracted from the first computing system at a second time, is stored and the second node having an OED value identifying the second time, and the graph generator being configured to generate a third node in the graph, the third node identifying a third path to a third storage location in the source data store where a result of a transformation performed on the first portion of user data and the second portion of user data is stored and the third node having an OED value identifying an older of the first time and second time.

Example 19 is the data removal computing system of any or all previous examples wherein the computer executable instructions, when executed by the one or more processors, cause the one or more processors to implement:
  a data reporting system configured to identify changes in the source data store, the graph generator being configured to modify the graph based on the changes to the source data store.

Example 20 is the data removal computing system of any or all previous examples wherein the data reporting system is configured to intermittently sweep the source data store by identifying a portion of the source data store that has been modified since a last time the source data store was swept and intermittently sweeping only the identified portion of the source data store.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data removal computer system, comprising:
  at least one processor; and
  memory storing instructions executable by the at least one processor, wherein the instructions, when executed, cause the data removal computer system to:
  identify an extraction time at which a portion of user data is extracted from a computing system;
  identify a path to a storage location in a source data store where the portion of user data, extracted from the computing system, is stored;
  generate, in a graph, a node that represents the portion of user data stored in the storage location in the source data store, wherein the node stores a path identifier that identifies the path to the storage location that stores the portion of user data, and an original extraction date (OED) value identifying an earliest source data timestamp corresponding to the node, the earliest source data timestamp comprising an earliest extraction time that indicates when user data that was used to derive the node was extracted from a corresponding substrate;
  intermittently traverse the graph;
  comparing the earliest extraction time corresponding to each node in the graph to an expiration time;
  identify the node as an expired node in the graph based on the comparing and a determination that the earliest extraction time, identified by the OED value, is older than the expiration time; and
  based on the identification of the node as an expired node, obtain the path identifier from the expired node,
  access the storage location in the source data store using the path identifier obtained from the expired node,
  delete the portion of user data stored at the storage location in the source data store, delete the expired node from the graph to obtain a modified graph, and store the modified graph in persistent memory.

2. The data removal computing system of claim 1, wherein the node comprises a first node, the path identifier comprises a first path identifier, the storage location comprises a first storage location, the portion of user data comprises a first portion of user data, the extraction time comprises a first extraction time, and the instructions, when executed, cause the data removal computer system to:

generate a second node in the graph, wherein the second node stores a second path identifier that identifies a second path to a second storage location in the source data store where a second portion of user data, that is extracted from the computing system at a second extraction time, is stored, and wherein the second node has an OED value identifying the second extraction time; and generate a third node in the graph, wherein the third node identifies a third path to a third storage location in the source data store where a result of a transformation performed on the first portion of user data and the second portion of user data is stored, and wherein the third node has an OED value identifying an older of the first extraction time and the second extraction time.

3. The data removal computing system of claim 2, wherein the instructions, when executed, cause the data removal computer system to:

identify changes in the source data store, and modify the graph based on the changes to the source data store.

4. The data removal computing system of claim 3 wherein the instructions, when executed, cause the data removal computer system to:

identify the first extraction time when the first portion of user data is extracted from the computing system;

identify the first storage location where the first portion of user data is stored in the source data store;

identify the second extraction time when the second portion of user data is extracted from the computing system;

identity the second storage location where the second portion of user data is stored;

identify a third extraction time when the first portion of user data is extracted from the first storage location and when the second portion of user data is extracted from the second storage location; and identify the third storage location where the result of the transformation performed on the first portion of user data and the second portion of user data is stored.

5. The data removal computing system of claim 3 wherein the instructions, when executed, cause the data removal computer system to:

identify the changes in the source data store by intermittently sweeping the source data store to identify the changes to the source data store.

6. The data removal computing system of claim 5 wherein the instructions, when executed, cause the data removal computer system to:

intermittently sweep the source data store by:

identifying a portion of the source data store that has been modified since a last time the source data store was swept, and intermittently sweeping only the identified portion of the source data store.

7. The data removal computing system of claim 3 wherein the instructions, when executed, cause the data removal computer system to:

expose an interface, and receive a change indicator through the exposed interface, the change indicator being indicative of a change to the source data store.

8. The data removal computing system of claim 2, wherein the instructions, when executed, cause the data removal computer system to:

generate an edge between the first node in the graph and the third node in the graph, the edge including:

a time stamp indicating when data was extracted from the first storage location, a source path indicator comprising the path to the first storage location, and a destination path indicator comprising the third path.

9. The data removal computing system of claim 8 wherein the instructions, when executed, cause the data removal computer system to:

generate an edge between the second node in the graph and the third node in the graph, the edge including:

a time stamp indicating when data was extracted from the second storage location, a source path indicator comprising the second path, and a destination path indicator comprising the third path.

10. A computer implemented method, comprising:

identifying a first extraction time at which a first portion of user data is extracted from a computing system;

identifying a first path to a first storage location in a source data store where the first portion of user data, extracted from the computing system, is stored;

generating, in a graph, a first node representing the first portion of user data stored in the first storage location, wherein the first node stores a path identifier identifying the first path to the first storage location, and has an original extraction date (OED) value identifying an earliest source data timestamp corresponding to the first node, the earliest source data timestamp comprising a first extraction time that indicates when user data that was used to derive the first node was extracted from a corresponding substrate;

identifying a second extraction time at which a second portion of user data is extracted from the computing system;

identifying a second path to a second storage location in the source data store where the second portion of user data, extracted from the computing system, is stored;

generating, in the graph, a second node representing the second portion of user data stored in the second storage location, wherein the second node identifies the second path to the second storage location, and includes an OED value identifying the second extraction time;

generating a third node in the graph, the third node identifying a third path to a third storage location in the source data store where a result of a transformation performed on the first portion of user data and the second portion of user data is stored, and the third node having an OED value identifying an older of the first extraction time and the second extraction time;

comparing the earliest extraction time corresponding to each node in the graph to an expiration time;

based on intermittently traversing the graph and the comparing, identifying a set of expired nodes as nodes in the graph that have an OED that is older than the expiration time; and for each respective expired node in the set of expired nodes, deleting a portion of user data, represented by the respective expired node, at a location in the source data store identified by a path identified by the respective expired node in the set of expired nodes, deleting the respective expired node from the graph to obtain a modified graph, and storing the modified graph in persistent memory.

11. The computer implemented method of claim 10, comprising:

identifying the second extraction time when the second portion of user data is extracted from the computing system;

identifying the second storage location where the second portion of user data is stored;

identifying a third extraction time when the first portion of user data is extracted from the first storage location and when the second portion of user data is extracted from the second storage location; and identifying the third storage location where a result of a transformation performed on the first portion of user data and the second portion of user data is stored.

12. The computer implemented method of claim 11 wherein identifying changes in the source data store comprises:

intermittently sweeping the source data store to identify the changes to the source data store.

13. The computer implemented method of claim 12 wherein intermittently sweeping the source data store comprises:

identifying a portion of the source data store that has been modified since a last time the source data store was swept; and intermittently sweeping only the identified portion of the source data store.

14. The computer implemented method of claim 11 wherein identifying changes comprises:

exposing an interface; and receiving a change indicator through the exposed interface, the change indicator being indicative of a change to the source data store.

15. The computer implemented method of claim 10 and further comprising:

generating an edge between the first node in the graph and the third node in the graph, the edge including:

a time stamp indicating when data was extracted from the first storage location, a source path indicator comprising the first path, and a destination path indicator comprising the third path.

16. The computer implemented method of claim 15 and further comprising:

generating an edge between the second node in the graph and the third node in the graph, the edge including:

a time stamp indicating when data was extracted from the second storage location, a source path indicator comprising the second path, and a destination path indicator comprising the third path.

17. A computer implemented method comprising:

identifying an extraction time at which a portion of user data is extracted from a computing system;

identifying a path to a storage location in a source data store where the portion of user data, extracted from the computing system, is stored; and generating, in a graph, a node that represents the portion of user data stored in the storage location in the source data store, wherein the node stores a path identifier that identities the path to the storage location that stores the portion of user data, and an original extraction date (OED) value identifying an earliest source data timestamp corresponding to the node, the earliest source data timestamp comprising an earliest extraction time that indicates when user data that was used to derive the node was extracted from a corresponding substrate;

intermittently traversing the graph;

comparing the earliest extraction time corresponding to each node in the graph to an expiration time;

identifying the node as an expired node in the graph based on the comparing and a determination that the earliest extraction time, identified by the OED value, is older than the expiration time; and based on the identification of the node as an expired node, obtaining the path identifier stored in the expired node, accessing the storage location in the source data store using the path identifier stored in the expired node, deleting the portion of user data stored at the storage location in the source data store, and deleting the expired node from the graph to obtain a modified graph, and store the modified graph in persistent memory.

18. The computer implemented method of claim 17 wherein the node comprises a first node, the path identifier comprises a first path identifier, the storage location comprises a first storage location, the portion of user data comprises a first portion of user data, the extraction time comprises a first extraction time, and the computer implemented method comprises:

generating a second node in the graph, the second node identifying a second path to a second storage location in the source data store where a second portion of user data, that is extracted from the computing system at a second extraction time, is stored, and the second node having an OED value identifying the second extraction time, and generating a third node in the graph, the third node identifying a third path to a third storage location in the source data store where a result of a transformation performed on the first portion of user data and the second portion of user data is stored, and the third node having an OED value identifying an older of the first extraction time and the second extraction time.

19. The computer implemented method of claim 18 and further comprising:

identifying changes in the source data store, and modifying the graph based on the changes to the source data store.

20. The computer implemented method of claim 19 and further comprising intermittently sweeping the source data store by identifying a portion of the source data store that has been modified since a last time the source data store was swept and intermittently sweeping only the identified portion of the source data store.

* * * * *